(12) United States Patent
Thibodeaux

(10) Patent No.: US 11,170,333 B2
(45) Date of Patent: Nov. 9, 2021

(54) SYSTEM AND METHOD FOR AN ADAPTIVE COMPETENCY ASSESSMENT MODEL

(71) Applicant: CompTIA, Downers Grove, IL (US)

(72) Inventor: Todd Thibodeaux, Elmhurst, IL (US)

(73) Assignee: COMPTIA, Downers Grove, IL (US)

( * ) Notice: Subject to any disclaimer, the term of this patent is extended or adjusted under 35 U.S.C. 154(b) by 90 days.

(21) Appl. No.: 16/427,634

(22) Filed: May 31, 2019

(65) Prior Publication Data

US 2019/0370719 A1 Dec. 5, 2019

Related U.S. Application Data

(60) Provisional application No. 62/678,627, filed on May 31, 2018.

(51) Int. Cl.
*G06Q 10/06* (2012.01)
*G06K 9/62* (2006.01)

(52) U.S. Cl.
CPC ..... *G06Q 10/06393* (2013.01); *G06K 9/6263* (2013.01); *G06Q 10/06395* (2013.01); *G06Q 10/063112* (2013.01)

(58) Field of Classification Search
None
See application file for complete search history.

(56) References Cited

U.S. PATENT DOCUMENTS

| | | | |
|---|---|---|---|
| 7,552,199 B2 | 6/2009 | Pomerantz | |
| 10,679,512 B1 * | 6/2020 | Yang | G09B 7/02 |
| 2002/0111926 A1 * | 8/2002 | Bebie | G06N 5/04 |
| | | | 706/45 |
| 2003/0017442 A1 | 1/2003 | Tudor et al. | |
| 2007/0282912 A1 * | 12/2007 | Reiner | G16H 10/20 |
| 2008/0027783 A1 * | 1/2008 | Hughes | G06Q 10/00 |
| | | | 705/7.14 |
| 2009/0012847 A1 * | 1/2009 | Brooks | G06Q 30/0201 |
| | | | 705/14.41 |
| 2009/0132313 A1 * | 5/2009 | Chandler | G06Q 10/06 |
| | | | 705/7.14 |
| 2012/0084238 A1 | 4/2012 | Kristal et al. | |

(Continued)

FOREIGN PATENT DOCUMENTS

WO 2018005656 A1 1/2018

OTHER PUBLICATIONS

International Search Report with Written Opinion in corresponding International Application No. PCT/US2019/034947 dated Aug. 19, 2019 (13 pages).

*Primary Examiner* — Sujay Koneru
(74) *Attorney, Agent, or Firm* — Jeffri A. Kaminski; Venable LLP

(57) ABSTRACT

Systems, methods, and computer-readable storage media for generating an adaptive competency assessment model. A system configured as described herein provides, at a first time: a tiered set of questions to a subject matter expert and, based on how the subject matter expert answers the questions, and identifies a best known path for answering the questions. At a second time, the system provides the tiered set of questions to a candidate, captures how the candidate answers the questions, compares that information to the best known path, and generates, based on that comparison, a live score as the candidate answers the questions.

20 Claims, 5 Drawing Sheets

(56) References Cited

U.S. PATENT DOCUMENTS

| | | | |
|---|---|---|---|
| 2012/0116549 A1* | 5/2012 | Warshaw | G06Q 10/00 700/91 |
| 2013/0224720 A1* | 8/2013 | Kearns | G09B 7/00 434/362 |
| 2014/0046709 A1 | 2/2014 | Kwapiszeski et al. | |
| 2014/0288944 A1* | 9/2014 | Miller | G09B 23/28 705/2 |
| 2015/0199911 A1* | 7/2015 | Paramoure | G09B 5/10 434/350 |
| 2015/0283455 A1* | 10/2015 | Nova | A63F 9/183 463/9 |
| 2015/0324811 A1* | 11/2015 | Courtright | H04W 4/06 705/7.32 |
| 2015/0325138 A1* | 11/2015 | Selinger | G09B 7/00 434/322 |
| 2016/0098937 A1* | 4/2016 | Boyer | G06F 16/285 434/350 |
| 2016/0371276 A1* | 12/2016 | Furtado | G06F 16/24578 |
| 2017/0213469 A1* | 7/2017 | Elchik | G06F 40/186 |
| 2017/0242915 A1* | 8/2017 | Torisawa | G06F 16/00 |
| 2017/0256174 A1* | 9/2017 | Goodfriend | H04W 12/12 |
| 2017/0272396 A1 | 9/2017 | Chhaya et al. | |
| 2017/0322939 A1* | 11/2017 | Byron | G06N 20/00 |
| 2018/0046938 A1* | 2/2018 | Allen | G06N 5/04 |
| 2019/0370719 A1* | 12/2019 | Thibodeaux | G06K 9/6263 |

* cited by examiner

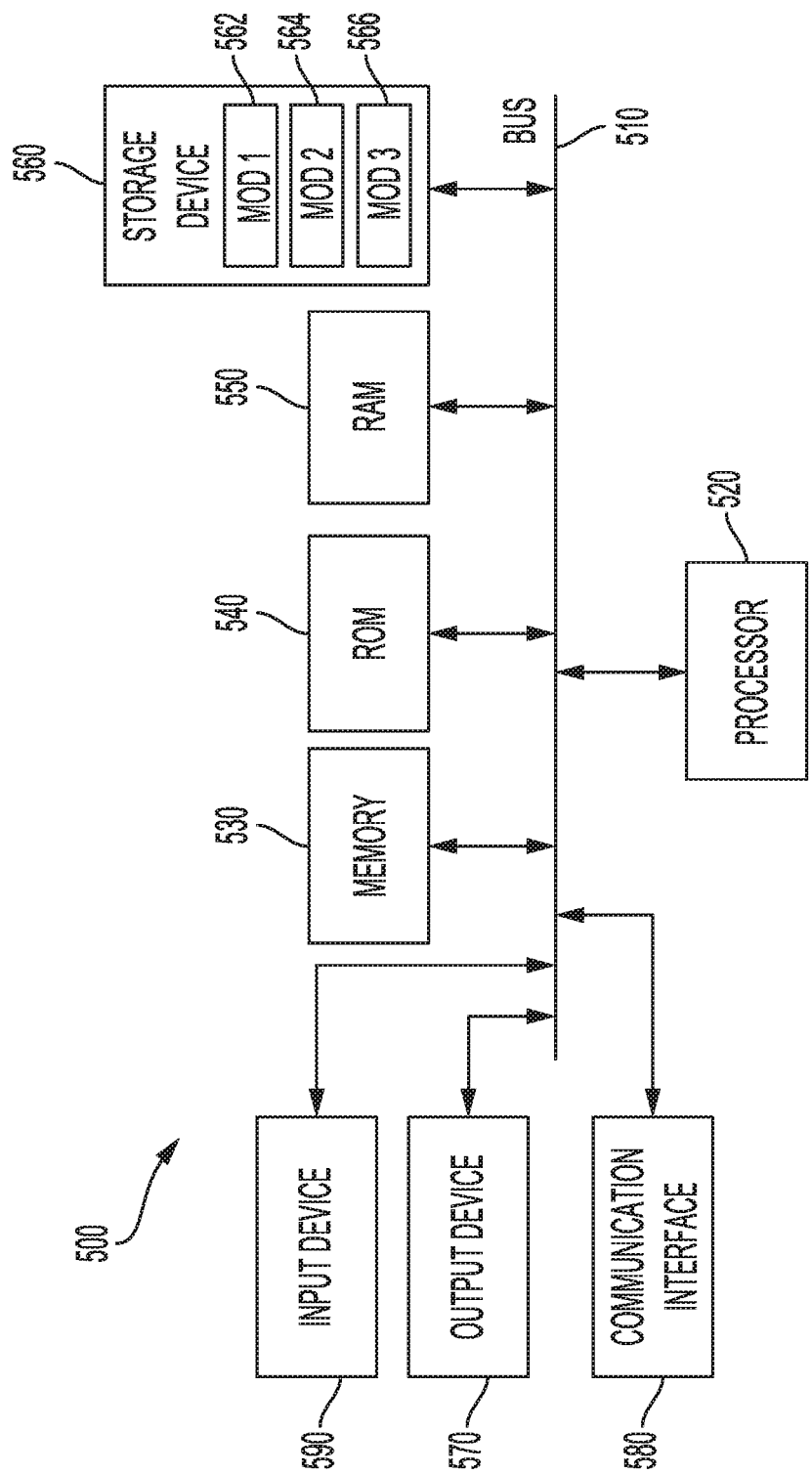

SYSTEM AND METHOD FOR AN ADAPTIVE COMPETENCY ASSESSMENT MODEL

PRIORITY

The present application claims priority to U.S. Provisional Application No. 62/678,627, filed May 31, 2018, the contents of which is incorporated herein in its entirety.

BACKGROUND

1. Technical Field

The present disclosure relates to identifying competency in users, and more specifically to an adaptive competency assessment model for identifying competencies in users.

2. Introduction

Employers are challenged to evaluate and determine true levels of competency for any given set of prospective candidates or incumbent employees in any given job role. At the same time, job seekers don't have a comprehensive, psychometrically valid way, beyond industry standard "high stakes" certifications, to demonstrate their maximum capacity. Even the best certification exams discount or overlook entirely important behavioral characteristics which are meaningful components of measuring competency. For example, how quickly did someone find the answer? How efficiently or creatively? Did they make many mistakes before stumbling on the right answer? Soft skills factor in too. Are they good communicators? Do they ask good questions? None of these measures are captured effectively by today's high stakes certifications.

Current exams are designed to give each test taker (candidate) the same experience. For example, questions are often organized into set groups or forms, each form being equivalent to another, so that a "fair" comparison between candidates can be made. This can result in two individuals receiving the same score on exam, but being substantially divergent in their true competency. An alternative to form testing, adaptive testing allows for varying levels of difficulty in the questions based on user performance. However adaptive testing solutions likewise fail to take into account the same behavioral measures mentioned above.

Current competency evaluations also suffer from the perception they only test for knowledge, not ability. To remedy this, test development organizations have included "performance-based" question types in their exams. These simulations require individuals to solve problems by working through real-world scenarios, interfaces, and challenges. But even the best simulations have a finite number of pathways to the best possible solution, and often they are implemented in a way that only measures the final state of the simulation. In other words, these exams only measure if the candidate obtains to a desired result, not the efficiency of how the candidate arrived to their solution.

SUMMARY

A method for performing the concepts disclosed herein can include: at a first time: providing, via a processor, a tiered set of questions to a subject matter expert; capturing, via the processor as the subject matter expert answers the tiered set of questions, first scoring factors of the subject matter expert in answering the tiered set of questions; and generating, based on the first scoring factors of the subject matter expert, a best known path for answering the tiered set of questions; and at a second time: providing, via the processor, the tiered set of questions to a candidate; capturing, via the processor as the candidate answers at least a portion of the tiered set of questions, second scoring factors of the candidate in answering the at least a portion of the tiered set of questions; comparing, as the candidate answers the at least a portion of the tiered set of questions, the second scoring factors to the best known path, resulting in a comparison; and generating, via the processor, based on the comparison, as the candidate answers the at least a portion of the tiered set of questions, a live score as the candidate answers the at least a portion of the tiered set of questions.

A system configured to perform the concepts disclosed herein can include: a processor; and a computer-readable storage medium having instructions stored which, when executed by the processor, cause the processor to perform operations including: at a first time: providing a tiered set of questions to a subject matter expert; capturing, as the subject matter expert answers the tiered set of questions, first scoring factors of the subject matter expert in answering the tiered set of questions; and generating, based on the first scoring factors of the subject matter expert, a best known path for answering the tiered set of questions; and at a second time: providing the tiered set of questions to a candidate; capturing, as the candidate answers at least a portion of the tiered set of questions, second scoring factors of the candidate in answering the at least a portion of the tiered set of questions; comparing, as the candidate answers the at least a portion of the tiered set of questions, the second scoring factors to the best known path, resulting in a comparison; and generating based on the comparison, as the candidate answers the at least a portion of the tiered set of questions, a live score as the candidate answers the at least a portion of the tiered set of questions.

A non-transitory computer-readable storage medium configured according to the concepts disclosed herein can contain instructions which, when executed by a processor, cause the processor to perform operations which can include: at a first time: providing a tiered set of questions to a subject matter expert; capturing, as the subject matter expert answers the tiered set of questions, first scoring factors of the subject matter expert in answering the tiered set of questions; and generating, based on the first scoring factors of the subject matter expert, a best known path for answering the tiered set of questions; and at a second time: providing the tiered set of questions to a candidate; capturing, as the candidate answers at least a portion of the tiered set of questions, second scoring factors of the candidate in answering the at least a portion of the tiered set of questions; comparing, as the candidate answers the at least a portion of the tiered set of questions, the second scoring factors to the best known path, resulting in a comparison; and generating based on the comparison, as the candidate answers the at least a portion of the tiered set of questions, a live score as the candidate answers the at least a portion of the tiered set of questions.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

FIG. 5 illustrates an exemplary computer system.

DETAILED DESCRIPTION

Figure 1:
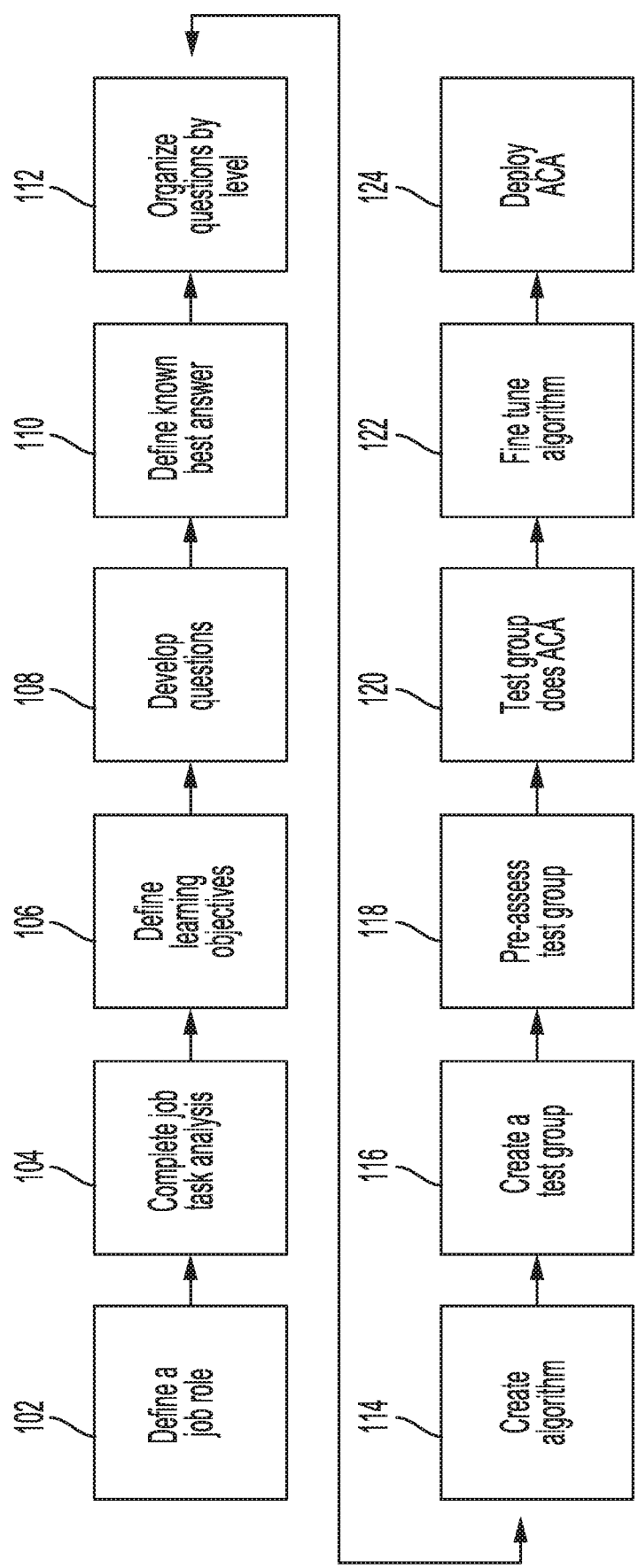
FIG. 1 illustrates an exemplary process for developing an adaptive competency assessment model.

Various embodiments of the disclosure are described in detail below. While specific implementations are described, it should be understood that this is done for illustration purposes only. Other components and configurations may be used without parting from the spirit and scope of the disclosure.

Disclosed herein is an adaptive competency assessment system which can provide more accurate competency assessment, prediction, and a path towards improved competency for a candidate. An adaptive competency assessment model as disclosed herein can have (1) questions which mimic issues and obstacles the candidate would face in a particular job role in the real-world; (2) questions which are significantly varied in type and style to reduce bias (for example, some individuals may do poorly with multiple choice types but express themselves better in long form responses or vice versa); (3) opportunity for the candidate to continue working until they've reached their maximum competency level; (4) the ability to take into account all available data, including behavioral characteristics, to score competency; (5) access to a library of curated resources to answer questions; (6) machine learning/artificial intelligence which analyzes all aspects of the candidates interaction with the adaptive competency assessment model (not just their answers to the questions); and (7) a relative scoring schema to weight job role objectives appropriately for the situation.

To develop an ACA (Adaptive Competency Assessment) model starts with a job task analysis. In one case, a representative group of subject matter experts (SMEs) work through the process of developing a detailed analysis of the knowledge and skills an individual needs in order to carry out the most important aspects of any given job role. From the analysis, a set of learning objectives (building blocks of knowledge) are identified, then questions are developed which determine whether the candidate has acquired the knowledge and skill required by an objective. These questions can be organized within a question bank, with rankings for each question across multiple jobs and multiple competency categories. For example, a set of questions may be specific to a certain job or competency, and within that set of questions the questions may be organized according to difficulty. Within the set of questions, the questions may be further organized into respective tiers based on the associated difficulty. For example, a portion of the set of questions can be categorized as level "1" questions, another portion as level "2" questions, and so on, where each respective increase in level signifies an increase in difficulty in answering the questions. In some cases, a single question can be ranked as difficult for a first job or job type while easy for a second job type. The question bank may also contain other questions which are not included in the set of questions because they are associated with other jobs or competencies.

Upon organizing the questions into tiers for a given job, the SMEs for that job can be provided the tiered question set for that job. As the SMEs complete the questions, the system can record various factors about how the SMEs answer the questions. For example, rather than just collecting the correct answers for each question, the system can record information about how the SMEs answer the questions. Examples of that collected data can include how much time was spent on each question, a time spent on all of the questions per relative difficulty of the respective question, mistakes made in answering the question, an ability to answer the question using resources from a library/database, and/or years of experience of the SME.

Using the collected data from the one or more SMEs, the system can generate a "best path" for answering the questions. This best path can be, for example, a multi-variable guideline for how to obtain the best results. To calculate the best path, the system can use averages, regressions, and/or other calculations for identifying the weights of the multiple variables being collected and analyzed.

As a candidate begins interviewing for a particular job, questions can be evaluated to determine which questions will best identify competencies for that specific job. Likewise, if a candidate is being interviewed generically (i.e., not for a particular job), a broad range of questions, selected based on their ability to predict competencies across a broad spectrum, may be selected. Selection/evaluation of the questions can be based on a comparison of historical data of previous users (job performance, displayed competencies, and/or answers of those previous users to the specific questions under consideration).

Unlike many current competency examinations, an ACA model can contain a diversity of questions developed. For example, in many current competency exams, the questions are typically of only a few types, like single response and multiple choice. In ACA, the question types might include free-form response, simulations, chatbot interactive, reading comprehension, fill in the blank, fill in the middle, step-by-step, and more. The SMEs also play a key role in determining the "known best answer" (KBA). While this is immediately obvious for single response or multiple choice type questions, it can be more complex to determine the KBA for a simulation or a free-form response.

ACA models configured as disclosed herein can identify if a candidate has reached a benchmark level of competency in one or more categories. For example, each level of competency identifiable by the ACA model can have a representative set of questions covering the most important objectives for a particular job role at that particular level. That is, there can be a predefined set of questions for a candidate seeking a "Level 1" competency, and distinct sets of predefined set of questions for candidates seeking "Level 2" or "Level 3" competencies. Each succeeding level may reference the same objectives, but each level contains questions which are demonstrably more challenging than the previous level. To advance to a higher, or subsequent, level, the candidate may need to demonstrate a predefined competency. In some scenarios, to demonstrate their competency, the candidate may need to obtain a threshold score (e.g., 80% or 100%) to move to the next level. In other scenarios, the score may be a factor, but how the candidate answers the question may also factor into the determination of competency. For example, if the user obtained 100% but took twice as long as the SMEs, the candidate may not be considered to be as competent as necessary for a given job or role.

Determinations of competencies using the disclosed system can be "open book." More specifically, the system can provide to the candidate a "library" of curated resources they can reference to answer questions. How the candidate utilizes this library can then be used to evaluate competency. For example, how does the candidate perform in sorting through many competing and sometimes contradictory pieces of information? What references do they look at first? In what order do they progress through references? How much time is spent looking at the question versus the reference? In other circumstances, the testing of competencies can be closed book, where the ability for the user to search other references and resources is limited.

Consider the following example of an evaluation. The first time a candidate begins a session, they will start at level 1. After answering all the questions defined for them at that level, the results will be analyzed by a machine learning/artificial intelligence algorithm. Among the things the algorithm will take into account: 1) the speed with which they answered each question or segment of question, 2) the efficiency with which they answered the questions, 3) the quality of their responses as judged against the KBA, 4) how efficiently they utilized the library and did they choose the highest quality resources, 5) the clarity of their writing, 6) the demographic characteristics of the individual. Each of these factors will be weighed and scored, then can be used to determine a competency score for the candidate. For example, the overall scale may be from 0-100. If the scale was applied in a linear fashion in a four-level ACA for instance, maximum mastery in level 1 would yield a score of 25, then 50 for mastery of level 2 and so on. Each level will have a cut score that determines if the individual can move on to the next level. In the same example, a candidate may have to achieve a score of at least 20 in level 1 to move on to level 2. When the candidate has reached their maximum level that is their score.

If the candidate fail to reach the last level (i.e., full mastery), when the candidate returns (or is re-evaluated), the candidate can be assigned to the last level they did not complete. Also, at the end of each level, and at the end of each level they fail to complete, the candidate can be presented with a score report that includes information about their score including: 1) how they did on each objective, 2) the quality of their responses, 3) the speed of their responses, 4) areas where they should seek additional training. This report can be customized to the candidate based on how their responses to questions, and the process of their responses, compared to the best known path created by the SMEs. In other words, this generated report can identify subject matter which the candidate needs to study further as well as test taking behavior which the candidate needs to further improve.

Each ACA model, for each job role, can be calibrated before it is deployed. The process may require a sample of individuals across different, predetermined competency levels. For example, for a three level system three groups of equal size may be required: one generally underqualified for the job role, a group generally qualified for the job role, and a group over qualified. These groups can provide sufficient data to enable the machine learning/artificial intelligence algorithm to modify the ACA model for a specific deployment. Each group will attempt to reach their maximum competency level.

The disclosure now turns to the specific examples illustrated by the figures. Features or aspects of the examples provided can be combined, removed, or otherwise incorporated into the other examples.

FIG. 1 illustrates an exemplary process for developing an adaptive competency assessment model. First, each job, or job role, for which competency is going to be tested needs to be defined (102). Specifically, the system queries human experts regarding the qualities, attributes, or requirements to perform a job. For example, does the job require sitting at a computer for 12+ hours/day? Does the job require fluency in a foreign language? Does the job require coding skills? Puzzle skills? Proficiency in spreadsheets? The answers to these questions are analyzed as part of a job task analysis (104), and used to define learning objectives (106) which any candidate would need to meet to provide competency at the job. These learning objectives are then used to develop questions (108). In some cases, developing the questions can mean selection of pre-generated question with known attributes based on a comparison of the job requirements to the question attributes. In other cases, developing the questions can require a semantics model (having language rules) combined with a vocabulary database, such that the processor creates new questions specifically designed for evaluating competency for the selected job (in other words, generating the questions from scratch using semantics rules, the job requirements, and a vocabulary database).

For each question, the system defines the known best answer (110). In addition, the system may assign values to other answers (i.e., rank the answers), or assign values to time spent answer the question, resources used, etc. The system organizes the questions by level (112) and creates an algorithm (114) for the questions. At this point, a preliminary ACA model is defined, and a test group is created (116) to test the preliminary ACA model. The test group is pre-assessed (118) to identify characteristics of the test group, then the ACA model is presented to the test group (120). Based on these results, the system fine tunes/modifies the ACA algorithm (122) to provide improved accuracy in identifying competencies, then deploys the ACA model (124).

Figure 2:
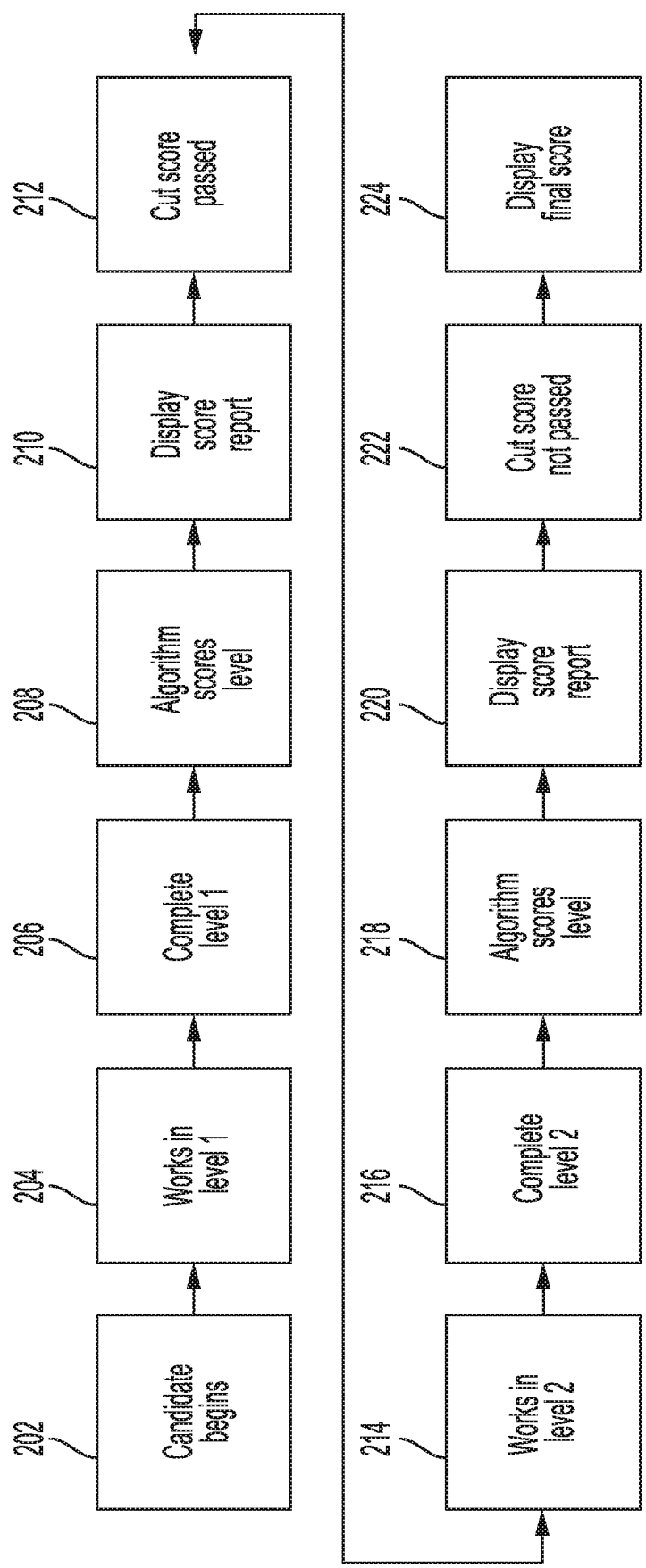
FIG. 2 illustrates an exemplary candidate flow through an adaptive competency assessment model.

FIG. 2 illustrates an exemplary candidate flow through an adaptive competency assessment model. As illustrated, the candidate begins (202) upon being presented a question from the ACA model. The candidate works in level 1 (204), completes level 1 (206), and the ACA algorithm scores the candidate's performance in level 1 (208). The system presents a score report (210) and, if the candidate's score for level 1 is above a predefined cut score (212), the candidate begins work in level 2 (214). The candidate completes level 2 (216), the ACA algorithm scores the candidate's performance in level 2 (218), and the system again presents a score report (220). This time, the score for level 2 did not meet the level 2 cut score (222), and the candidate is not moving on to level 3. The system displays the final score (224), and the competency evaluation ends.

Figure 3:
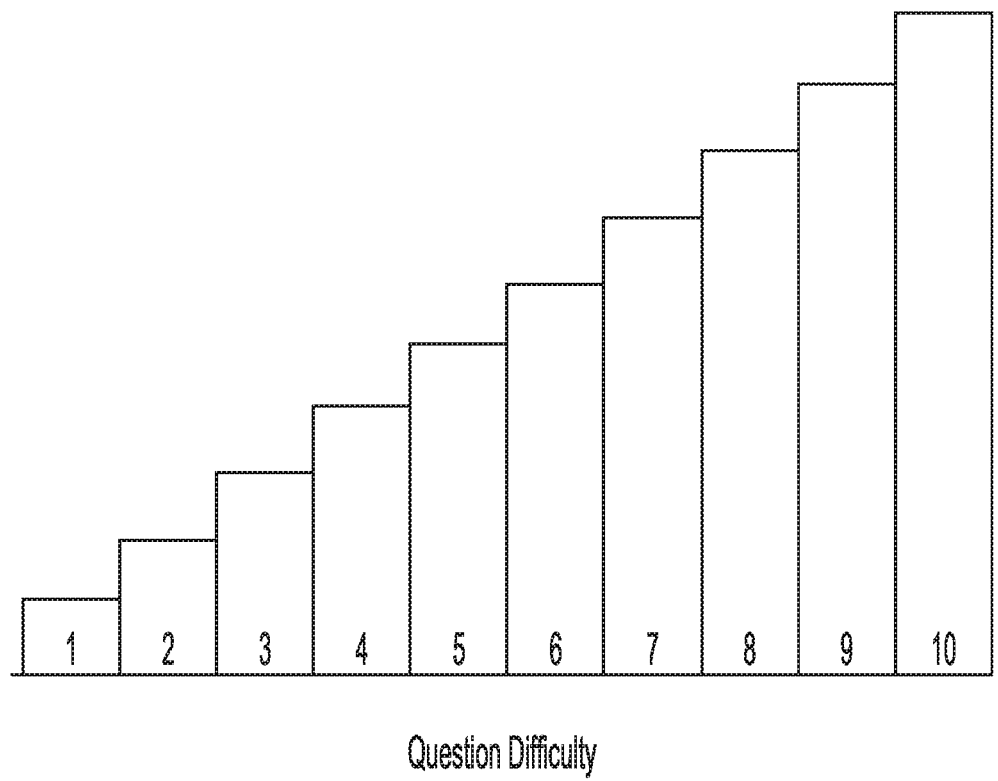
FIG. 3 illustrates an example of escalating question difficulty.

FIG. 3 illustrates an example of question difficulty increasing in difficulty with each tier. As illustrated, the tenth tier of questions is ten times (10×) more difficult than the first tier of questions. In an example configuration, the candidate must obtain a perfect score for a previous/lower level before moving on to the subsequent questions at a higher difficulty.

Figure 4:
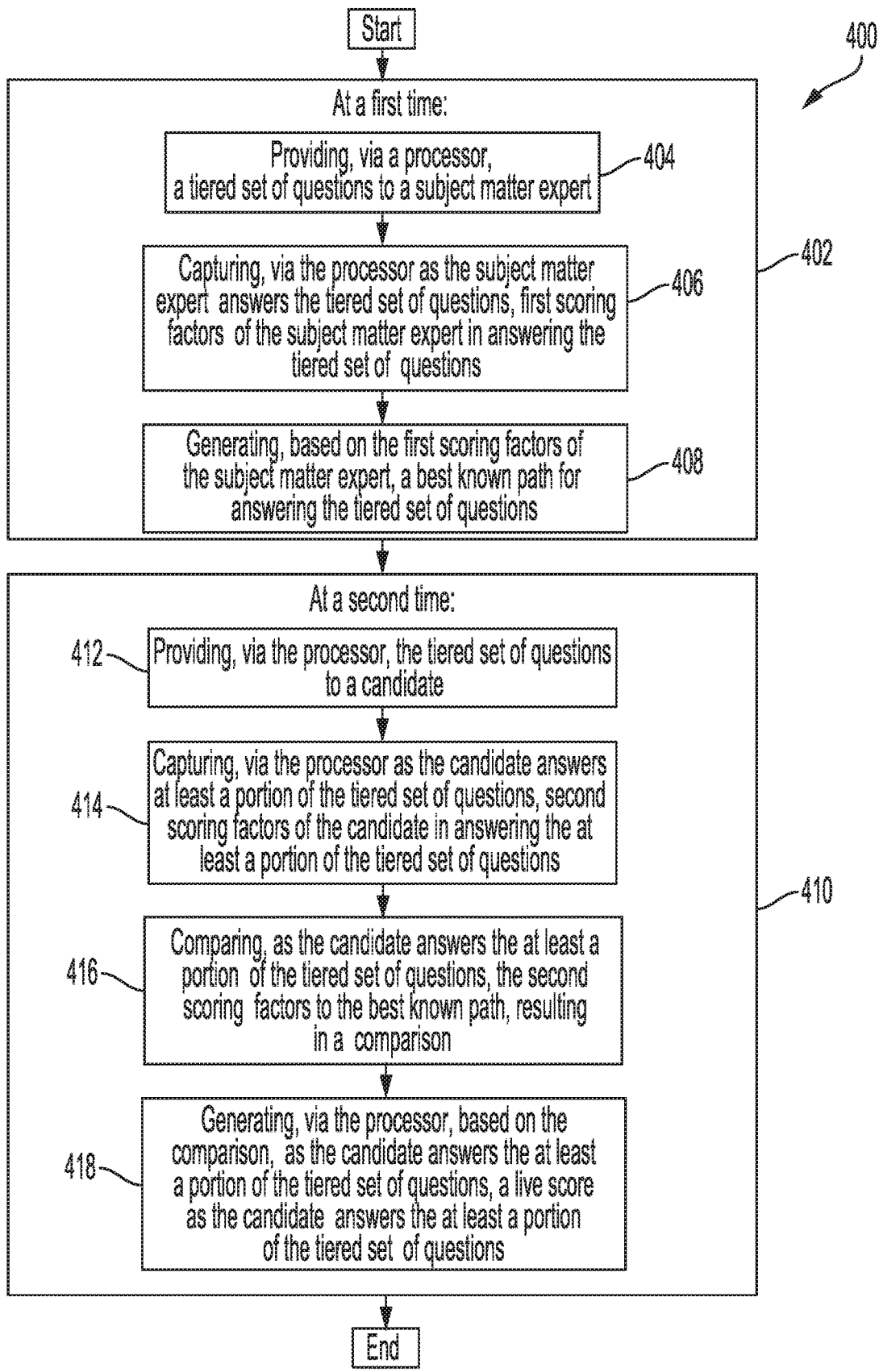
FIG. 4 an example method embodiment.

FIG. 4 illustrates an example method embodiment. The steps outlined herein are exemplary and can be implemented in any combination thereof, including combinations that exclude, add, or modify certain steps. A system performing a method as illustrated can at a first time (402): provide, via a processor, a tiered set of questions to a subject matter expert (404); capture, via the processor as the subject matter expert answers the tiered set of questions, first scoring factors of the subject matter expert in answering the tiered set of questions (406); and generate, generating, based on the first scoring factors of the subject matter expert, a best known path for answering the tiered set of questions (408). At a second time (410), the system can: provide, via the processor, the tiered set of questions to a candidate (412); capture, via the processor as the candidate answers at least a portion of the tiered set of questions, second scoring factors of the candidate in answering the at least a portion of the tiered set of questions (414); compare, as the candidate answers the at least a portion of the tiered set of questions, the second scoring factors to the best known path, resulting in a comparison (416); and generate, via the processor, based on the comparison, as the candidate answers the at least a portion of the tiered set of questions, a live score as the candidate answers the at least a portion of the tiered set of questions (418).

In some configurations, the first scoring factors and the second scoring factors can include a time spent on each question and/or mistakes in finding the right answer.

In some configurations, to advance to a next tier in the tiered set of questions, the candidate must correctly answer all of the questions in a given tier.

In some configurations, the method can further include displaying the live score on a display as the candidate answers the at least a portion of the tiered set of questions. Similarly, in some configurations, the method can further include: upon the candidate failing to correctly finish a tier of questions within the tiered set of questions, generating a custom study guide for the candidate based on the comparison and the second scoring factors.

In some configurations, each question in the tiered set of questions can have a list of associated answers, each answer in the list of answers having a weighted core competency associated with at least one job in a plurality of job roles.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
   at a first time:
      providing, via a processor, a first tiered set of questions to a subject matter expert;
      capturing, via the processor as the subject matter expert answers the first tiered set of questions, first scoring factors of the subject matter expert in answering the first tiered set of questions; and
      generating, based on the first scoring factors of the subject matter expert, a best known path for answering the first tiered set of questions; and
   at a second time:
      retrieving, via the processor, job requirements associated with a candidate;
      generating, via the processor using a semantics model, a vocabulary database, and the job requirements, a second tiered set of questions;
      providing, via the processor, the second tiered set of questions to the candidate;
      capturing, via the processor as the candidate answers at least a portion of the second tiered set of questions, second scoring factors of the candidate in answering the at least a portion of the second tiered set of questions, the second scoring factors comprising:
         a speed at which each question in the portion of the second tiered set of questions is answered;
         an efficiency at which each question in the portion of the second tiered set of questions is answered;
         a quality of a response compared to the best known path;
         an efficiency of usage of a database library;
         a clarity of a written response; and
         demographic characteristics of the candidate;
      comparing, as the candidate answers the at least a portion of the second tiered set of questions, the second scoring factors to the best known path, resulting in a comparison;
      analyzing, via the processor executing an artificial intelligence algorithm, the second scoring factors, resulting in weights and scores of each factor in the second scoring factors; and
      generating, via the processor, based on the comparison and the weights and scores of each factor in the second scoring factors, as the candidate answers the at least a portion of the second tiered set of questions, a live score as the candidate answers the at least a portion of the second tiered set of questions.

2. The method of claim 1, wherein the first scoring factors and the second scoring factors comprise a time spent on each question.

3. The method of claim 2, wherein the first scoring factors and the second scoring factors further comprise mistakes in finding the right answer.

4. The method of claim 1, wherein to advance to a next tier in the second tiered set of questions, the candidate must correctly answer all of the questions in a given tier.

5. The method of claim 1, further comprising displaying the live score on a display as the candidate answers the at least a portion of the second tiered set of questions.

6. The method of claim 1, further comprising:
   upon the candidate failing to correctly finish a tier of questions within the second tiered set of questions, generating a custom study guide for the candidate based on the comparison and second scoring factors.

7. The method of claim 1, wherein each question in the second tiered set of questions has a list of associated answers, each answer in the list of answers having a weighted core competency associated with at least one job in a plurality of job roles.

8. A system, comprising:
   a processor; and
   a non-transitory computer-readable storage medium having instructions stored which, when executed by the processor, cause the processor to perform operations comprising:
      at a first time:
         providing a first tiered set of questions to a subject matter expert;
         capturing, as the subject matter expert answers the first tiered set of questions, first scoring factors of the subject matter expert in answering the first tiered set of questions; and
         generating, based on the first scoring factors of the subject matter expert, a best known path for answering the first tiered set of questions; and
      at a second time:
         retrieving job requirements associated with a candidate;
         generating, using a semantics model, a vocabulary database, and the job requirements, a second tiered set of questions;
         providing the second tiered set of questions to the candidate;
         capturing, as the candidate answers at least a portion of the second tiered set of questions, second scoring factors of the candidate in answering the at least a portion of the second tiered set of questions, the second scoring factors comprising:
            a speed at which each question in the portion of the second tiered set of questions is answered;
            an efficiency at which each question in the portion of the second tiered set of questions is answered;
            a quality of a response compared to the best known path;
            an efficiency of usage of a database library;
            a clarity of a written response; and
            demographic characteristics of the candidate;
         comparing, as the candidate answers the at least a portion of the second tiered set of questions, the second scoring factors to the best known path, resulting in a comparison;
         analyzing, via execution of an artificial intelligence algorithm, the second scoring factors, resulting in weights and scores of each factor in the second scoring factors; and
         generating based on the comparison and the weights and scores of each factor in the second scoring factors, as the candidate answers the at least a portion of the second tiered set of questions, a live score as the candidate answers the at least a portion of the second tiered set of questions.

9. The system of claim 8, wherein the first scoring factors and the second scoring factors comprise a time spent on each question.

10. The system of claim 9, wherein the first scoring factors and the second scoring factors further comprise mistakes in finding the right answer.

11. The system of claim 8, wherein to advance to a next tier in the second tiered set of questions, the candidate must correctly answer all of the questions in a given tier.

12. The system of claim 8, the non-transitory computer-readable storage medium having additional instructions stored which, when executed by the processor, cause the processor to perform operations comprising displaying the live score on a display as the candidate answers the at least a portion of the second tiered set of questions.

13. The system of claim 8, the non-transitory computer-readable storage medium having additional instructions stored which, when executed by the processor, cause the processor to perform operations comprising:
upon the candidate failing to correctly finish a tier of questions within the second tiered set of questions, generating a custom study guide for the candidate based on the comparison and the second scoring factors.

14. The system of claim 8, wherein each question in the second tiered set of questions has a list of associated answers, each answer in the list of answers having a weighted core competency associated with at least one job in a plurality of job roles.

15. A non-transitory computer-readable storage medium having instructions stored which, when executed by a computing device, cause the computing device to perform operations comprising:
at a first time:
providing a first tiered set of questions to a subject matter expert;
capturing, as the subject matter expert answers the first tiered set of questions, first scoring factors of the subject matter expert in answering the first tiered set of questions; and
generating, based on the first scoring factors of the subject matter expert, a best known path for answering the first tiered set of questions; and
at a second time:
retrieving job requirements associated with a candidate;
generating, using a semantics model, a vocabulary database, and the job requirements, a second tiered set of questions;
providing the second tiered set of questions to the candidate;
capturing, as the candidate answers at least a portion of the second tiered set of questions, second scoring factors of the candidate in answering the at least a portion of the second tiered set of questions, the second scoring factors comprising:
a speed at which each question in the portion of the second tiered set of questions is answered;
an efficiency at which each question in the portion of the second tiered set of questions is answered;
a quality of a response compared to the best known path;
an efficiency of usage of a database library;
a clarity of a written response; and
demographic characteristics of the candidate;
comparing, as the candidate answers the at least a portion of the second tiered set of questions, the second scoring factors to the best known path, resulting in a comparison;
analyzing, via execution of an artificial intelligence algorithm, the second scoring factors, resulting in weights and scores of each factor in the second scoring factors; and
generating based on the comparison and the weights and scores of each factor in the second scoring factors, as the candidate answers the at least a portion of the second tiered set of questions, a live score as the candidate answers the at least a portion of the second tiered set of questions.

16. The non-transitory computer-readable storage medium of claim 15, wherein the first scoring factors and the second scoring factors comprise a time spent on each question.

17. The non-transitory computer-readable storage medium of claim 16, wherein the first scoring factors and the second scoring factors further comprise mistakes in finding the right answer.

18. The non-transitory computer-readable storage medium of claim 15, wherein to advance to a next tier in the second tiered set of questions, the candidate must correctly answer all of the questions in a given tier.

19. The non-transitory computer-readable storage medium of claim 15, having additional instructions stored which, when executed by the computing device, cause the computing device to perform operations comprising displaying the live score on a display as the candidate answers the at least a portion of the second tiered set of questions.

20. The non-transitory computer-readable storage medium of claim 15, having additional instructions stored which, when executed by the computing device, cause the computing device to perform operations comprising:
upon the candidate failing to correctly finish a tier of questions within the second tiered set of questions, generating a custom study guide for the candidate based on the comparison and the second scoring factors.

* * * * *